(12) United States Patent
Munoz et al.

(10) Patent No.: US 11,453,270 B2
(45) Date of Patent: Sep. 27, 2022

(54) AIR VENT FOR A VEHICLE

(71) Applicant: GM GLOBAL TECHNOLOGY OPERATIONS LLC, Detroit, MI (US)

(72) Inventors: Angel R. Munoz, Rochester Hills, MI (US); Roman Szocinski, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 363 days.

(21) Appl. No.: 16/734,508

(22) Filed: Jan. 6, 2020

(65) Prior Publication Data
US 2021/0206238 A1 Jul. 8, 2021

(51) Int. Cl.
*B60H 1/34* (2006.01)
(52) U.S. Cl.
CPC ... *B60H 1/3421* (2013.01); *B60H 2001/3478* (2013.01)
(58) Field of Classification Search
CPC .............. B60H 1/3421; B60H 1/3414; B60H 2001/3478

USPC ......................................................... 454/155
See application file for complete search history.

(56) References Cited

U.S. PATENT DOCUMENTS

| 3,802,328 | A | * | 4/1974 | Kakizaki | F24F 13/065 |
| | | | | | 454/154 |
| 10,131,210 | B2 | * | 11/2018 | Belzons | B60H 1/3421 |
| 10,406,891 | B2 | * | 9/2019 | Gareis | B60H 1/3421 |
| 2017/0057328 | A1 | * | 3/2017 | Sano | B60H 1/3442 |

* cited by examiner

*Primary Examiner* — Avinash A Savani
*Assistant Examiner* — Dana K Tighe
(74) *Attorney, Agent, or Firm* — Vivacqua Crane PLLC

(57) ABSTRACT

A vehicle air vent includes a primary vane system pivotal about a horizontal axis to direct an air flow from an outlet of the vehicle air vent in an up/down direction and including a primary vane, a secondary vane system pivotal about a vertical axis to direct an air flow from an outlet of the vehicle air vent in a side-to-side direction and including a secondary vane, and an air flow volume control system including a control knob movable in a fore/aft direction for adjusting the volume of air flow through the air vent.

13 Claims, 7 Drawing Sheets

AIR VENT FOR A VEHICLE

FIELD

The present disclosure relates to an air vent for a vehicle.

INTRODUCTION

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

Modern passenger vehicles include a heating, ventilation, and air conditioning (HVAC) system that allows a vehicle occupant to control the temperature or adjust other settings of a vehicle interior. For instance, a motor-driven fan or blower circulates conditioned air to the vehicle interior through air vents. Some vehicles are equipped with heated and/or cooled seats, a heated steering wheel, and other features that collectively improve the overall drive experience. HVAC systems may include front and rear defrosters for improving visibility through the windshield and rear window, respectively. An occupant of the vehicle selects desired HVAC system settings using dials, knobs, push-buttons, and/or touch screens.

Air vents for vehicles are typically integrated into instrument panels which are increasingly limited in the amount of space that is available in the instrument panel and the locations in the instrument panel which are available for the air vents to be positioned. Additionally, a vehicle air vent needs to be integrated into an instrument panel in a manner which is aesthetically pleasing to the vehicle occupants. In order to improve the aesthetics, vehicle designers may desire that the air vents seamlessly integrate with other elements in the instrument panel. For example, in a design aesthetic theme which emphasizes a single element horizontally across the instrument panel, any element which fails to follow this theme and/or which interrupts this horizontal element is undesirable. Further, in order to reduce cost and to improve the simplicity of operation and design, it is desirable to provide a single control element for an air vent which not only controls the up/down and side to side direction of air flow from the air vent, but which also provides control over the volume of flow from each, individual air vent.

SUMMARY

In an exemplary aspect, a vehicle air vent includes a primary vane system pivotal about a horizontal axis to direct an air flow from an outlet of the vehicle air vent in an up/down direction and including a primary vane, a secondary vane system pivotal about a vertical axis to direct an air flow from an outlet of the vehicle air vent in a side-to-side direction and including a secondary vane, and an air flow volume control system including a control knob movable in a fore/aft direction for adjusting the volume of air flow through the air vent.

In another exemplary aspect, the control knob is mounted on the primary vane.

In another exemplary aspect, the control knob is slidable in a side-to-side direction on the primary vane for adjusting the secondary vane system to direct an air flow from an outlet of the vehicle air vent in a side-to-side direction.

In another exemplary aspect, the control knob is rotatable together with the primary vane about the horizontal axis to direct an air flow from an outlet of the vehicle air vent in an up/down direction.

In another exemplary aspect, the control knob includes an internal slot that slidably engages the primary vane in the fore/aft direction.

In another exemplary aspect, the air flow volume control system includes a volume control link engaging the control knob.

In another exemplary aspect, the volume control link includes an arcuate slot that receives a pin on the control knob.

In another exemplary aspect, the control knob includes a pair of arms extending rearwardly and holding the pin horizontally between the pair of arms.

In another exemplary aspect, the control link slidably engages a race track in a secondary vane retainer.

In another exemplary aspect, the air flow volume control system includes a volume control door that engages the volume control link.

In another exemplary aspect, the volume control link includes a linear gear rack having gear teeth that engage gear teeth on a pinion gear on the volume control door.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the present invention are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Figure 1:
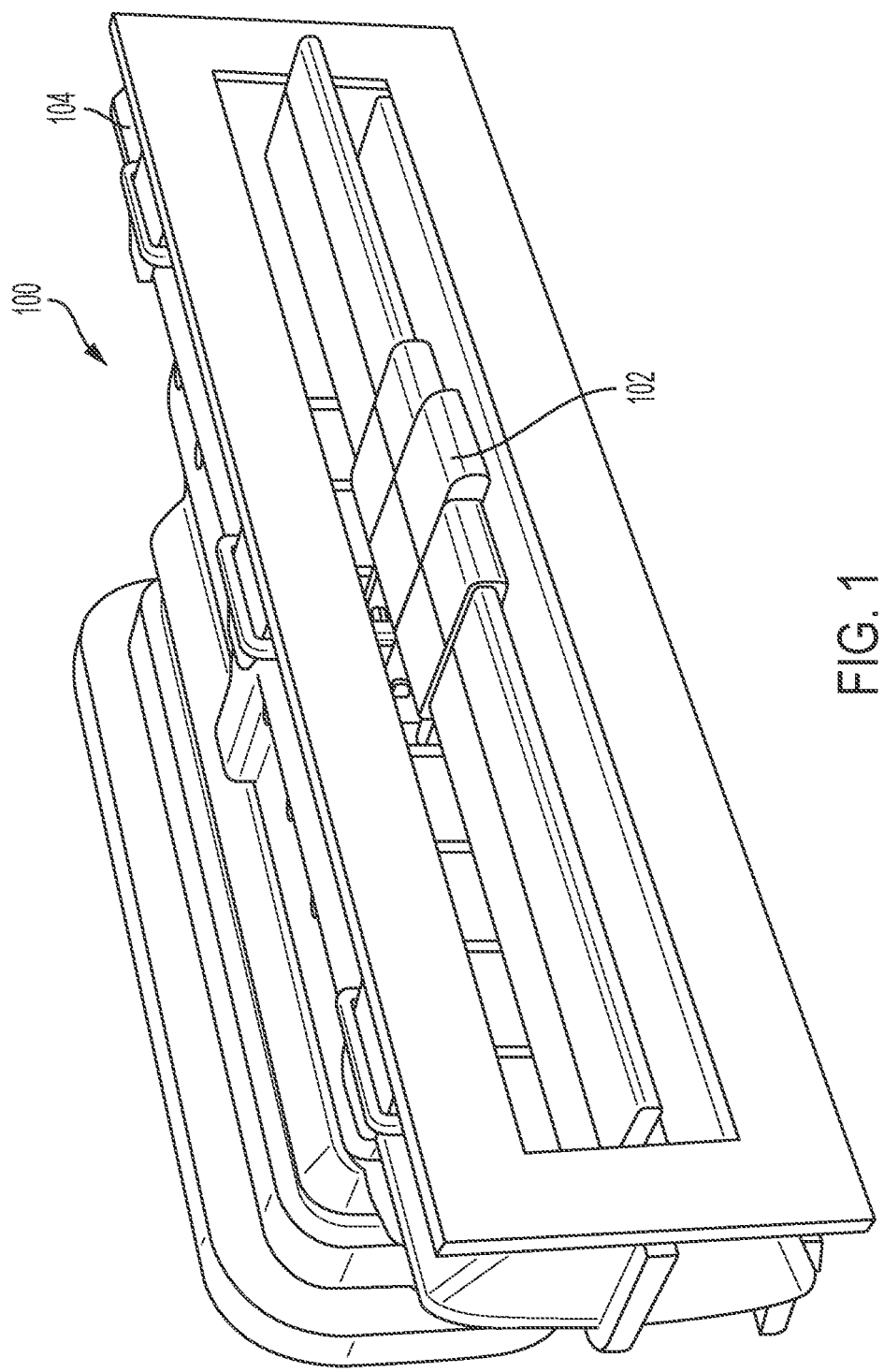
FIG. 1 is a perspective view of an air vent incorporating an air flow volume control with a slider knob in accordance with an exemplary embodiment of the present disclosure.

Reference will now be made in detail to several examples of the disclosure that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Referring now to the drawings, wherein like reference numbers correspond to like or similar components throughout the several figures, FIG. 1 is a perspective view of an air vent 100 incorporating an air flow volume control into a slider knob 102 in accordance with an exemplary embodiment of the present disclosure. The air vent 100 includes a primary vane 104 on which the slider knob 102 is mounted. Movement of the slider knob 102 in an up or down direction results in a corresponding upward or downward rotation of the primary vane 104 which causes the air flow exiting the air vent 100 to move in a corresponding up or down direction. Further, as will be described in more detail below, the slider knob 102 is slidable in a side to side direction on the primary vane 104 in order to control the side to side direction of the air flow exiting the air vent 100. Additionally, in accordance with the present disclosure, the slider knob 102 is also movable in a forward/aft direction in order to control the volume of air flow exiting the air vent 100.

Figure 6:
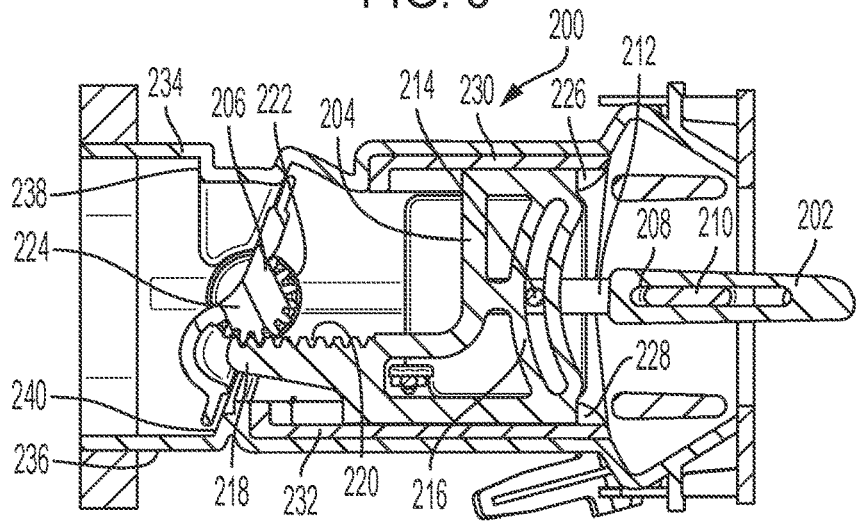
FIG. 6 is another cross-section elevation view of the air vent of FIG. 1 in a door closed configuration.
Figure 7:
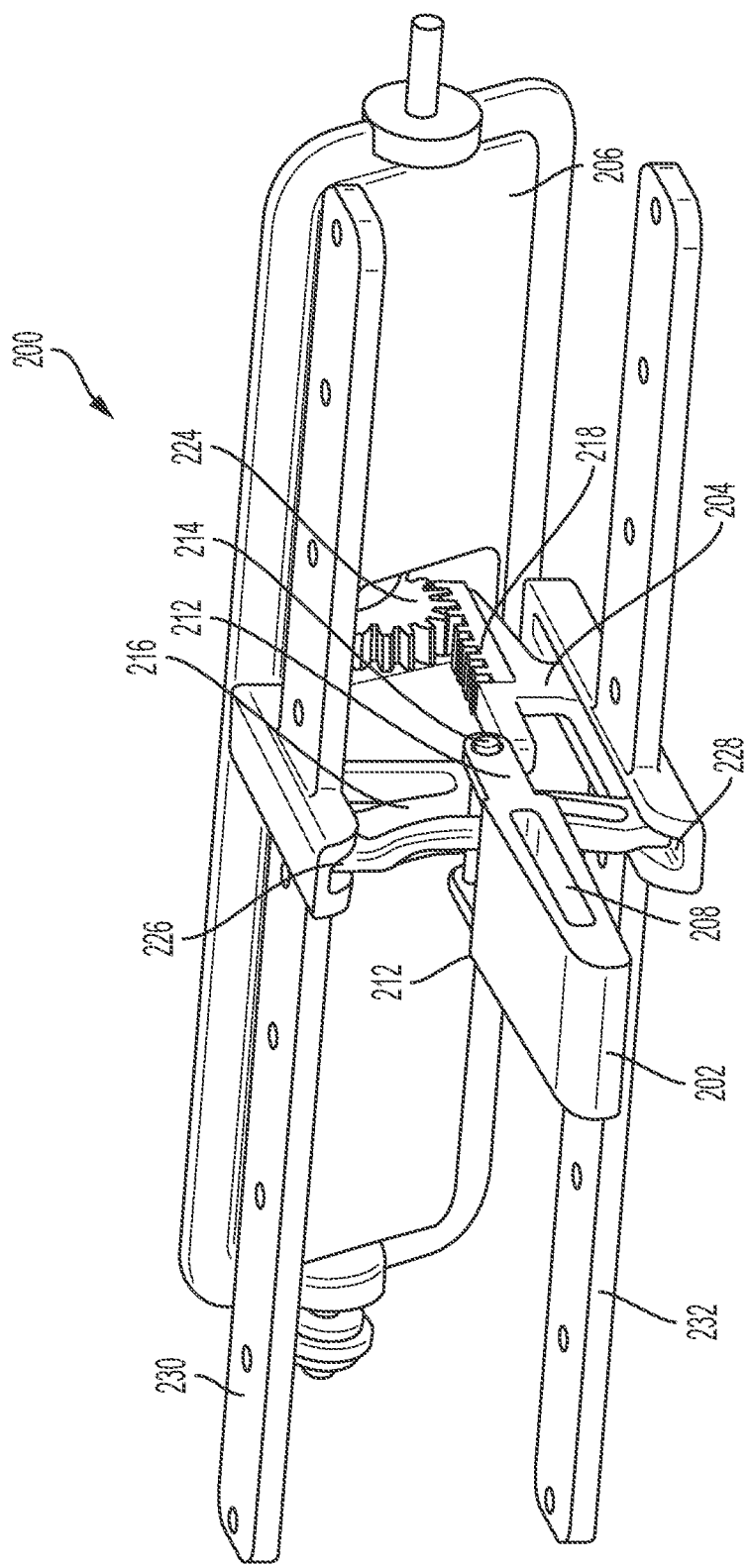
FIG. 7 illustrates a perspective view of an air vent volume control system in accordance with the present disclosure.

FIGS. 2-6 illustrate cross-section views of an exemplary embodiment of an air vent volume control system 200 in accordance with the present disclosure and FIG. 7 illustrates a perspective view of the air vent volume control system 200 in isolation. The volume control system 200 includes a control knob 202, a volume control link 204, and a volume door 206. The control knob 202 includes an internal slot 208 which slidably engages a primary vane 210 of the exemplary air vent. The control knob 202 further includes a pair of arms 212 which hold a pin 214 between them. The pin 214 of the control knob 202 engages an arcuate slot 216 of the volume control link 204. The volume control link 204 includes a rack 218 which includes teeth 220 that engage teeth 222 on the door 206. In a preferred embodiment, the engagement between the door 206 and the volume control link 204 form a rack and pinion type of gear arrangement in which the link 204 includes a linear rack 218 that engages a pinion or circular gear 224 on the door 206. The volume control link 204 also slidably engages between race tracks 226 and 228 on secondary vane upper retainer 230 and secondary vane lower retainer 232, respectively. Further, the rear door 206 is pivotally captured between upper housing 234 and lower housing 236.

Figure 2:
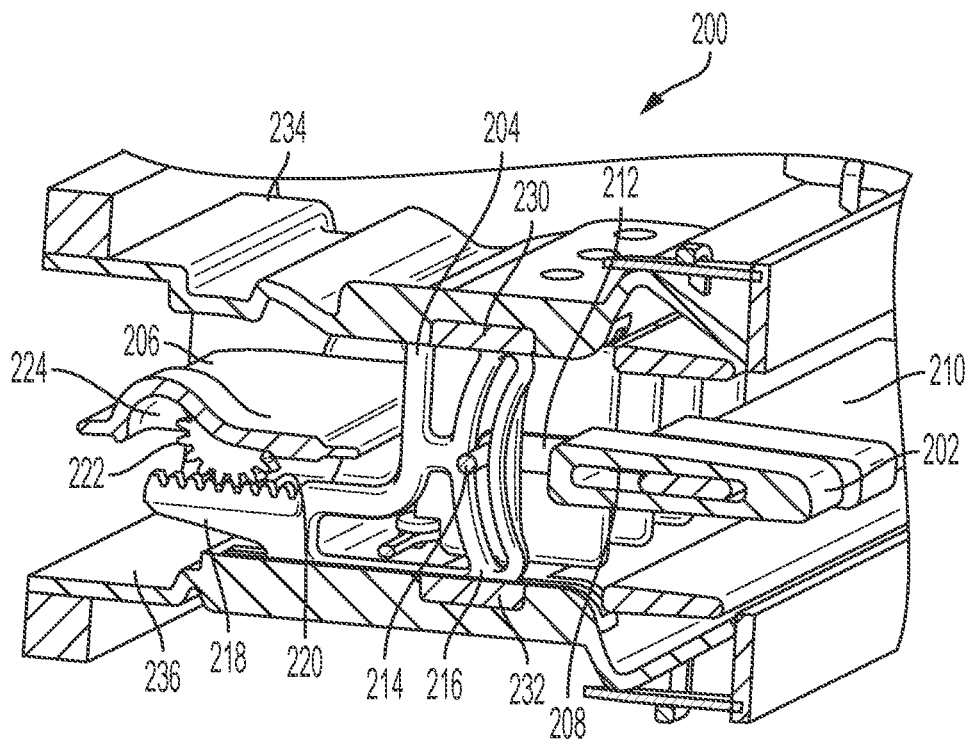
FIG. 2 is a cross-sectional perspective view of the air vent of FIG. 1 in a door open configuration.
Figure 3:
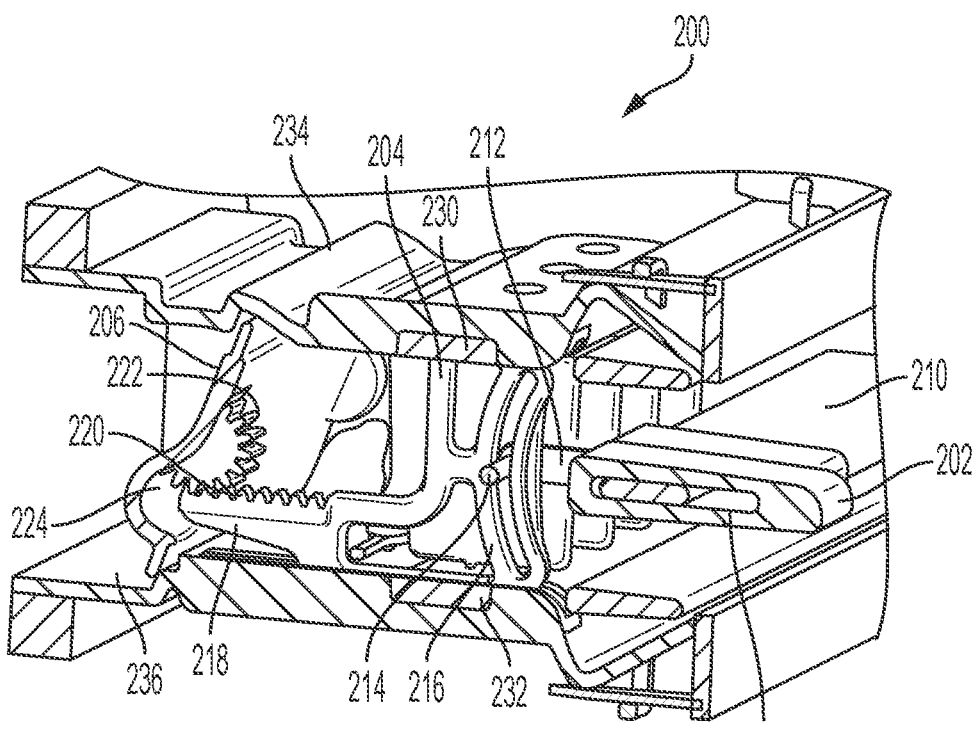
FIG. 3 is a cross-sectional perspective view of the air vent of FIG. 1 in a door closed configuration.
Figure 4:
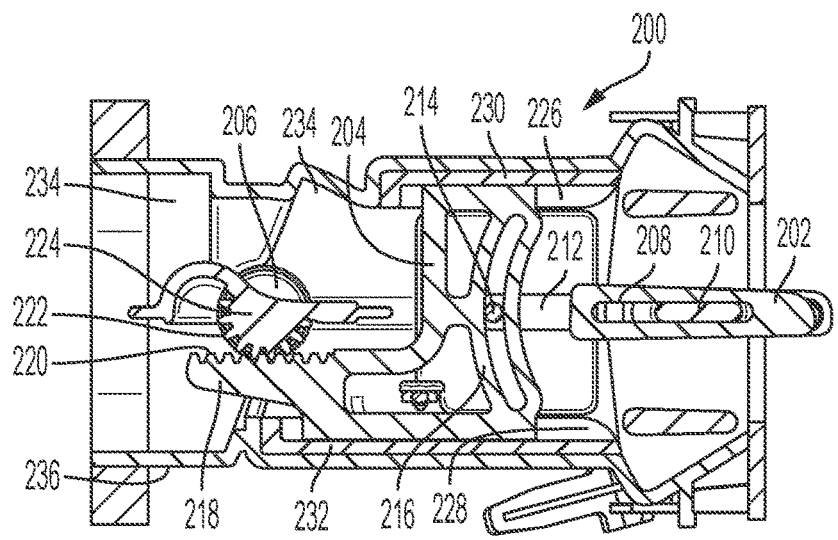
FIG. 4 is another cross-section elevation view of the air vent of FIG. 1 in a door open configuration.
Figure 5:
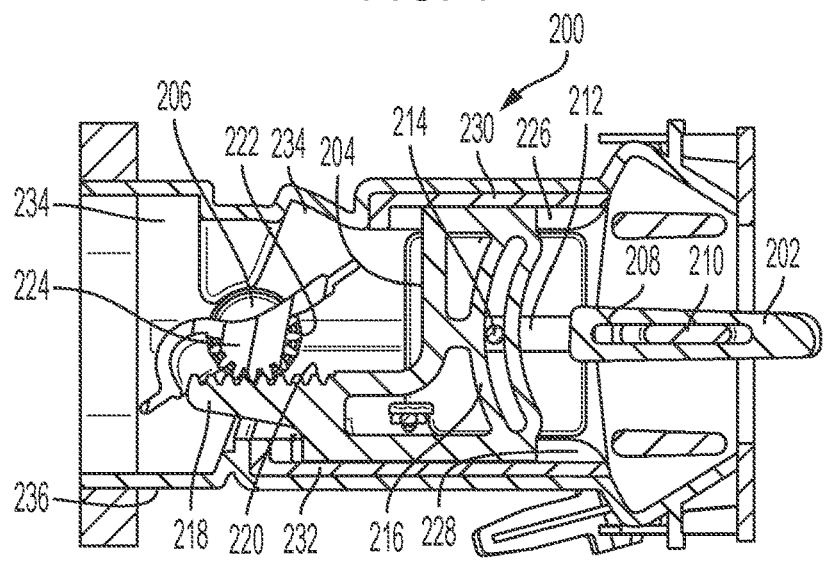
FIG. 5 is another cross-section elevation view of the air vent of FIG. 1 in a door partially open configuration.

Operation of the volume control system 200 will now be described with reference to FIGS. 2-7. FIGS. 2 and 4 both illustrate the volume control system 200 in a fully open configuration. In the fully open configuration, the rear door 206 is rotatably oriented in a position which permits a full flow of air through the air vent. A vehicle occupant may operate the volume control system 200 to reduce the volume of air flowing through the air vent by pulling on the control knob 202. Pulling on the control knob 202 causes the control knob 202 to slide outwardly on the primary vane 210. In response, the pin 214 that is captured by arms 212 of the control knob 202 moves in the same direction. Since the pin 214 is captured within the arcuate slot 216 of the volume control link 204 the control link 204 also slidably moves along the race tracks 226 and 228 of the upper and lower retainers 230 and 232 in the same direction. Engagement between the teeth 220 on the rack 218 of the control link 204 and the teeth 22 of the door 206 causes the door 206 to rotate. As a result, movement of the control knob 202 in an outward direction causes the door 206 to rotate between the fully open configuration illustrated in FIGS. 2 and 4 to the door partially open configuration illustrated in FIG. 5 and continued motion of the control knob 202 in the outward direction causes the door 206 to continue to rotate until it reaches the door closed configuration that is illustrated in FIGS. 3 and 6. Rotation of the door 206 may be limited by door stops 238 and 240 incorporated into the upper housing 234 and lower housing 236, respectively. The above described operation may be reversed by a vehicle occupant by pushing the control knob 202 such that it moves in an inward direction. In this manner, the volume control system 200 may be easily transitioned between fully open and closed configurations, including all configurations between these two configurations, by selectively moving the control knob 202 inward or outward from the air vent.

Figure 8:
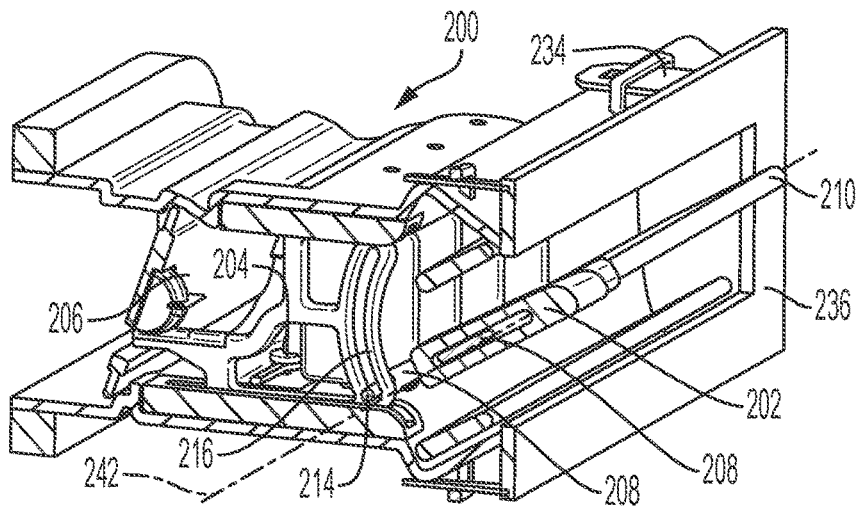
FIG. 8 illustrates a cross-sectional perspective view of an air vent volume control system in a first primary vane configuration in accordance with the present disclosure.
Figure 9:
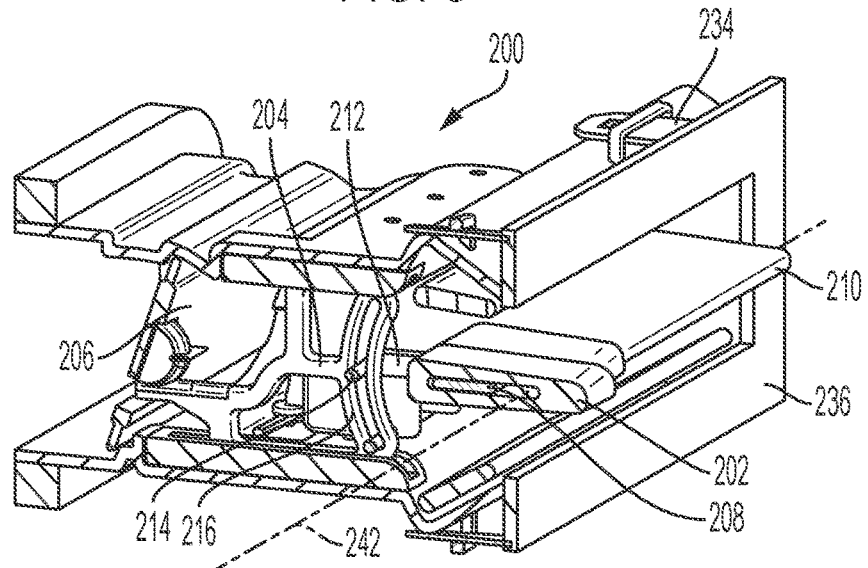
FIG. 9 illustrates a cross-sectional perspective view of an air vent volume control system in a second primary vane configuration in accordance with the present disclosure.
Figure 10:
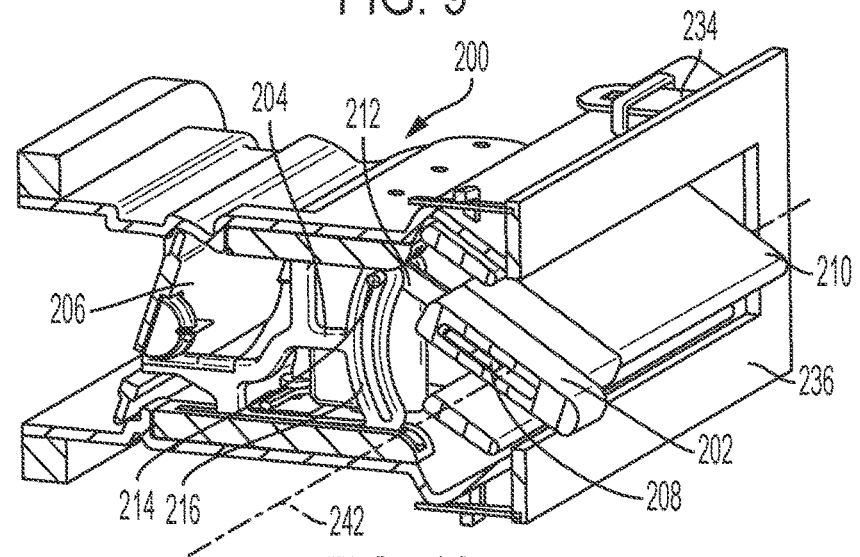
FIG. 10 illustrates a cross-sectional perspective view of an air vent volume control system in a first primary vane configuration in accordance with the present disclosure.
Figure 11:
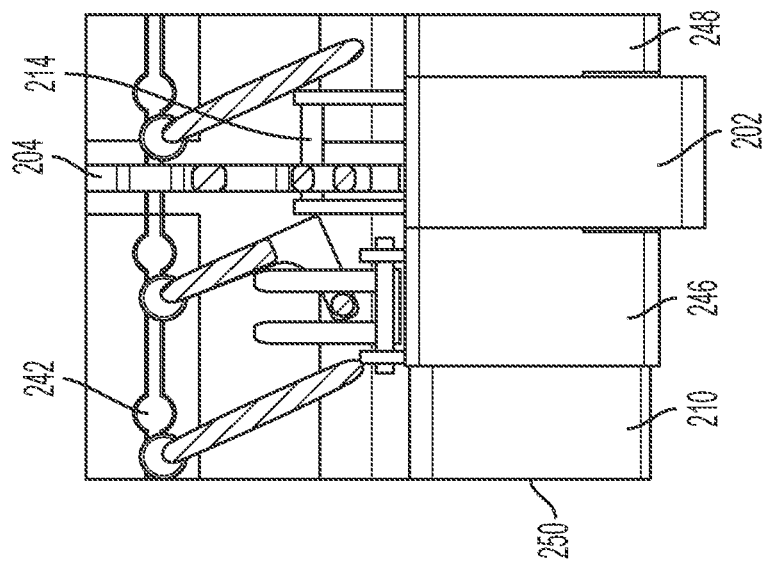
FIG. 11 illustrates a plan view of an air vent volume control system in a first secondary vane configuration in accordance with the present disclosure.
Figure 12:
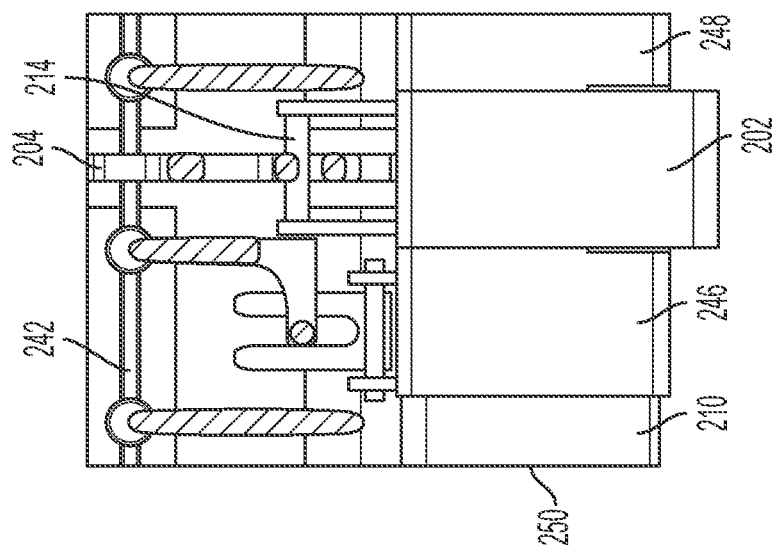
FIG. 12 illustrates a plan view of an air vent volume control system in a second secondary vane configuration in accordance with the present disclosure.
Figure 13:
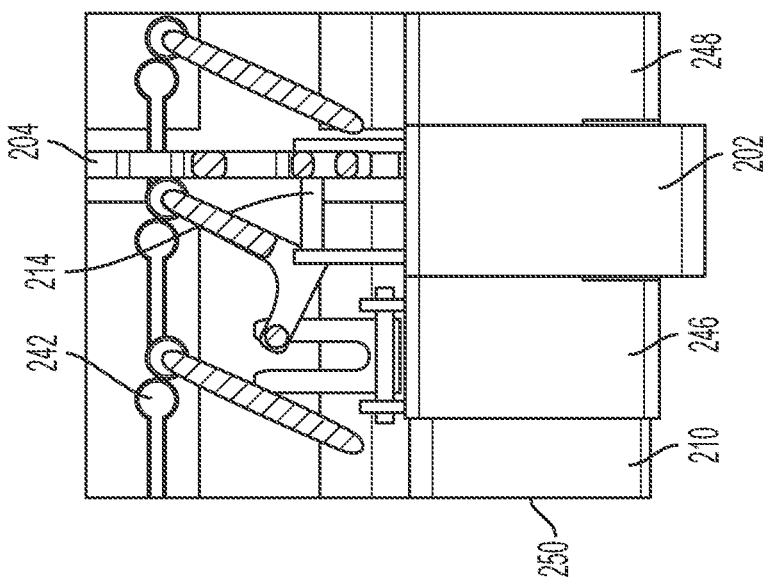
FIG. 13 illustrates a plan view of an air vent volume control system in a third secondary vane configuration in accordance with the present disclosure.
Figure 14:
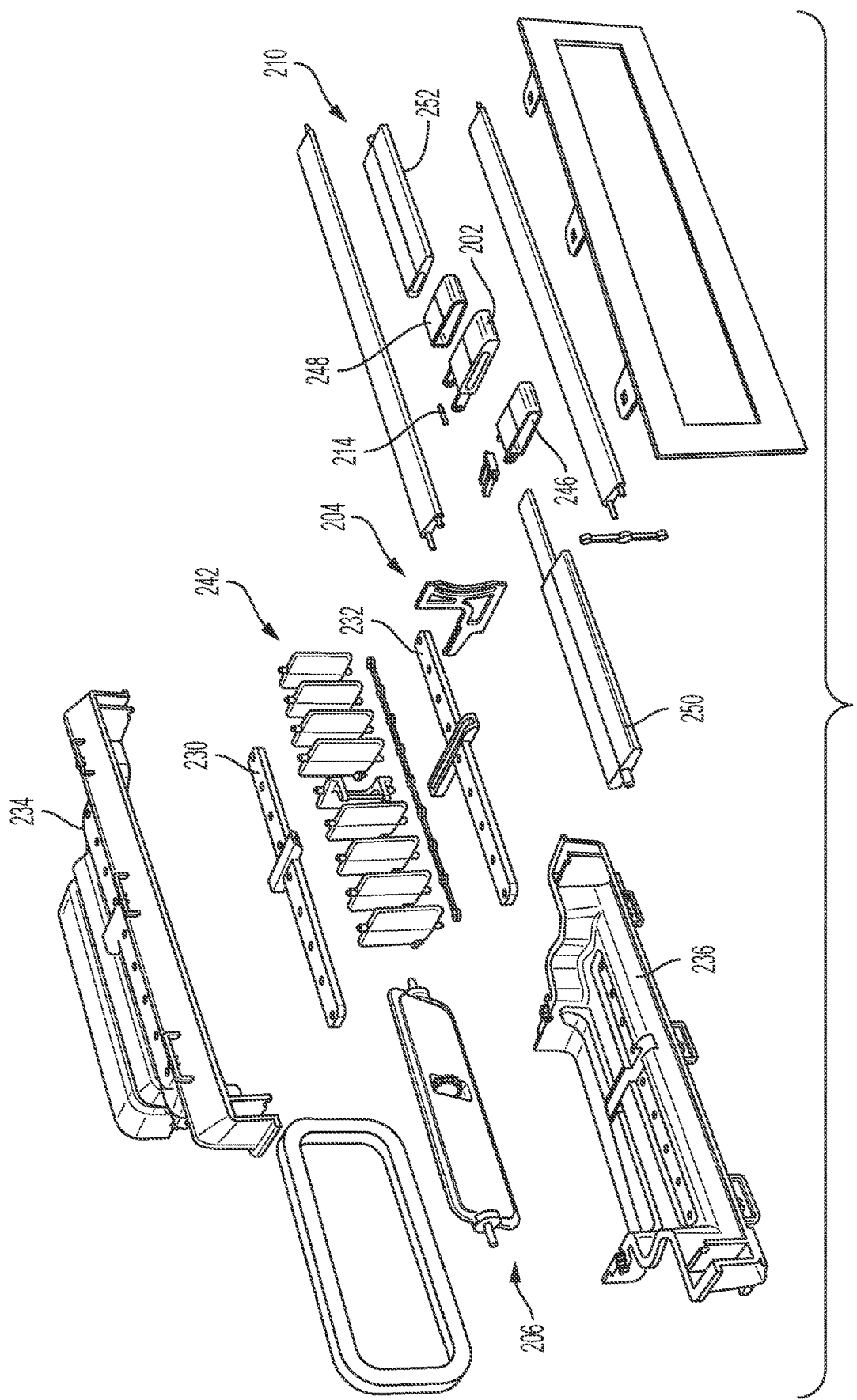
FIG. 14 is an exploded view of an air vent incorporating an air vent volume control system in accordance with the present disclosure.

The volume control system of the present disclosure is adapted to operate while enabling adjustment of both the primary vane(s) and the secondary vane(s) systems of a vehicle air vent. FIGS. 8-10 illustrate the ability to operate the primary vanes 210 fully independently and without interference of the air flow volume control system 200 of the present disclosure. The control link 204 includes the arcuate slot 216 which captures the pin 214 that is connected between pairs of arms 212 on the control knob 202. As explained above, the control knob 202 includes an internal slot 208 which slidably captures the primary vane 210. The primary vane 210 (or vanes) pivotally engage the upper and/or lower housings, 234 and 236, in a manner which permits rotation of the primary vane 210 around a horizontal axis 242. The control knob 202 is able to easily rotate along with the primary vane 210 about the horizontal axis 242 because pin 214 is able to move up and/or down within arcuate slot 216 of the control link 204. In this manner, a vehicle occupant may easily adjust the flow of the air exiting the air vent in an upward or downward direction by rotating the control knob 202 around the horizontal axis 242 without causing any air flow volume adjustment.

Referring now to FIGS. 11-14, operation of the secondary vanes 242 independently and without interference from or interference with the air flow volume control system 200 of the present disclosure is illustrated. The control knob 202 engages with a first slider 246 and second slider 248. Similar to the control knob 202, each of the first slider 246 and second slider 248 includes a slot which receives a first primary vane half 250 and a second primary vane half 252, respectively and which permit side to side motion along the horizontal axis 242 of the primary vane 210. In a preferred embodiment, the first slider 246 and second slider 248 capture the control knob 202 between them on the primary vane 210. In this manner, the control knob 202 is able to move in a side-to-side direction together with both of the first slider 246 and the second slider 248 along the horizontal axis 242 of the primary vane 210. Operation of the secondary vanes 242 by movement of the sliders 246 and 248 are conventional and will not be described herein for purposes of brevity. However, one may understand operation of the secondary vanes 242 by observing the detailed illustrations of FIGS. 11-14. The control knob 202 of the volume control system 200 of the present disclosure may be operated without interfering with the operation of the secondary vane(s). As is clearly illustrated, the pin 214 extends a distance parallel to the horizontal axis 242 through the arcuate slot 216 of the control link 204 by a distance that is sufficient to permit side to side movement of the control knob 202 together with the sliders 246 and 248.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A vehicle air vent comprising:
   a primary vane system pivotal about a horizontal axis to direct an air flow from an outlet of the vehicle air vent in an up/down direction and including a primary vane;
   a secondary vane system pivotal about a vertical axis to direct the air flow from the outlet of the vehicle air vent in a side-to-side direction and including a secondary vane; and
   an air flow volume control system including a control knob movable in a fore/aft direction for adjusting a volume of the air flow through the vehicle air vent, wherein the air flow volume control system includes a volume control link engaging the control knob, the volume control link includes an arcuate slot that receives a pin on the control knob, and the control knob includes a pair of arms extending rearwardly and holding the pin horizontally between the pair of arms.

2. The vehicle air vent of claim 1, wherein the control knob is mounted on the primary vane.

3. The vehicle air vent of claim 2, wherein the control knob is slidable in the side-to-side direction on the primary vane for adjusting the secondary vane system to direct the air flow from the outlet of the vehicle air vent in the side-to-side direction.

4. The vehicle air vent of claim 2, wherein the control knob includes an internal slot that slidably engages the primary vane in the fore/aft direction.

5. The vehicle air vent of claim 2, wherein the control knob is rotatable together with the primary vane about the horizontal axis to direct the air flow from the outlet of the vehicle air vent in the up/down direction.

6. The vehicle air vent of claim 1, wherein the volume control link slidably engages a race track in a secondary vane retainer.

7. The vehicle air vent of claim 1, wherein the air flow volume control system includes a volume control door that engages the volume control link.

8. The vehicle air vent of claim 7, wherein the volume control link includes a linear gear rack having gear teeth that engage gear teeth on a pinion gear on the volume control door.

9. A vehicle air vent comprising:
   a primary vane system pivotal about a horizontal axis to direct an air flow from an outlet of the vehicle air vent in an up/down direction and including a primary vane;
   a secondary vane system pivotal about a vertical axis to direct the air flow from the outlet of the vehicle air vent in a side-to-side direction and including a secondary vane; and
   an air flow volume control system including a control knob mounted on the primary vane, wherein the control knob is movable on the primary vane in the fore/aft direction for adjusting a volume of the air flow through the vehicle air vent, wherein the control knob is slidable in the side-to-side direction on the primary vane for adjusting the secondary vane system to direct the air flow from the outlet of the vehicle air vent in the side-to-side direction, and wherein the control knob is rotatable together with the primary vane about the horizontal axis to direct the air flow from the outlet of the vehicle air vent in the up/down direction,
   wherein the air flow volume control system includes a volume control link engaging the control knob, the volume control link includes an arcuate slot that receives a pin on the control knob, and the control knob includes a pair of arms extending rearwardly and holding the pin horizontally between the pair of arms.

10. The vehicle air vent of claim 9, wherein the volume control link slidably engages a race track in a secondary vane retainer.

11. The vehicle air vent of claim 9, wherein the air flow volume control system includes a volume control door that engages the volume control link.

12. The vehicle air vent of claim 11, wherein the volume control link includes a linear gear rack having gear teeth that engage gear teeth on a pinion gear on the volume control door.

13. A vehicle air vent comprising:
   a primary vane system pivotal about a horizontal axis to direct an air flow from an outlet of the vehicle air vent in an up/down direction and including a primary vane;
   a secondary vane system pivotal about a vertical axis to direct the air flow from the outlet of the vehicle air vent in a side-to-side direction and including a secondary vane; and
   an air flow volume control system including a control knob that includes an internal slot that slidably engages the primary vane in a fore/aft direction, a volume control link includes an arcuate slot that receives a pin on the control knob, wherein the control knob includes a pair of arms extending rearwardly and holding the pin horizontally between the pair of arms, and a volume control door, wherein the volume control link slidably engages a race track in a secondary vane retainer, wherein the volume control link includes a linear gear rack having gear teeth that engage gear teeth on a pinion gear on the volume control door, wherein the control knob is movable on the primary vane in the fore/aft direction for adjusting a volume of the air flow through the vehicle air vent, the control knob is slidable in the side-to-side direction on the primary vane for adjusting the secondary vane system to direct the air flow from the outlet of the vehicle air vent in the side-to-side direction, and wherein the control knob is rotatable together with the primary vane about the horizontal axis to direct the air flow from the outlet of the vehicle air vent in the up/down direction.

* * * * *